United States Patent [19]

Kacirek et al.

[11] Patent Number: 4,606,900
[45] Date of Patent: Aug. 19, 1986

[54] METHOD OF PREPARING CRYSTALLINE ZEOLITIC ALUMINOSILICATES

[75] Inventors: Harmut Kacirek, Norderstedt; Andreas Meyer, Hamburg, both of Fed. Rep. of Germany

[73] Assignee: Sud-Chemie Aktiengesellschaft, Munich, Fed. Rep. of Germany

[21] Appl. No.: 694,536

[22] Filed: Jan. 24, 1985

[30] Foreign Application Priority Data

Jan. 27, 1984 [DE] Fed. Rep. of Germany ....... 3402842

[51] Int. Cl.$^4$ ............................................. C01B 33/28
[52] U.S. Cl. .................................... 423/329; 423/328; 502/60; 502/77
[58] Field of Search .................. 423/328, 329; 502/77, 502/60

[56] References Cited

U.S. PATENT DOCUMENTS

| | | | |
|---|---|---|---|
| 3,709,979 | 1/1973 | Chu ..................................... | 423/328 |
| 3,947,482 | 3/1976 | Albers et al. ......................... | 423/328 |
| 4,073,865 | 2/1978 | Flanigen et al. ...................... | 423/339 |
| 4,146,584 | 3/1979 | Rollmann ............................. | 502/77 |
| 4,175,114 | 11/1979 | Plank et al. .......................... | 423/329 |
| 4,309,313 | 1/1982 | Barret et al. ......................... | 423/328 |
| 4,333,859 | 6/1982 | Vaughan et al. ..................... | 423/328 |
| 4,444,738 | 4/1984 | Suzuki et al. ........................ | 423/329 |
| 4,511,547 | 4/1985 | Iwayama et al. ..................... | 423/329 |
| 4,526,879 | 7/1985 | Dwyer et al. ........................ | 423/329 |

FOREIGN PATENT DOCUMENTS

| | | | |
|---|---|---|---|
| 0057016 | 8/1982 | European Pat. Off. ............. | 423/329 |
| 1066940 | 1/1984 | U.S.S.R. .............................. | 423/328 |

OTHER PUBLICATIONS

Zelimir Gabelica et al., "Synthesis and Characterization of ZSM-5 Type Zeolites III. A Critical Evaluation of the Role of Alkali and Ammonium Compounds" *Applied Catalysis* 5 (1983) 227–248.

Robert W. Thompson, "Mathematical Analyses of Zeolite Crystallization" *Zeolites*, 1985, vol. 5, Jul. pp. 202–210.

Kuei-Jung Chao et al., "Kinetic Studies on the Formation of Zeolite ZSM-5" J. Chem. Soc. Faraday Trans. I, 1981, 77, 547–555.

D. A. Jacobs, editor, *Structure and Reactivity of Modified Zeolites*, Elsevier, N.Y. 1984, pp. 107–123.

Ryszard Mostowicz et al., "Morphological Study of ZSM-5 Grown in the 12Na$_2$O/4.5(TPA)$_2$O System" *Zeolites*, vol. 3, Jul. 1983, pp. 219–225.

*Primary Examiner*—John Doll
*Assistant Examiner*—Jackson Leeds
*Attorney, Agent, or Firm*—Sprung Horn Kramer & Woods

[57] ABSTRACT

There is disclosed an improvement in the preparation of a crystalline zeolitic aluminosilicate with an atomic Si-to-Al ratio $\geq 10$ by hydrothermal crystallization from a reaction batch that contains SiO$_2$ and Al$_2$O$_3$ or their hydrated derivatives or alkali silicates and aluminates along with crystallization accelerators and optionally in the copresence of a quaternary ammonium compound amino or mixture of alcohol and ammonia, in an aqueous and alkaline medium, the improvement wherein an aged but still X-ray amorphous aluminosilicate nucleating gel with an atomic Si-to-Al ratio $\geq 10$ is added to the reaction batch as a crystallization accelerator.

15 Claims, 1 Drawing Figure

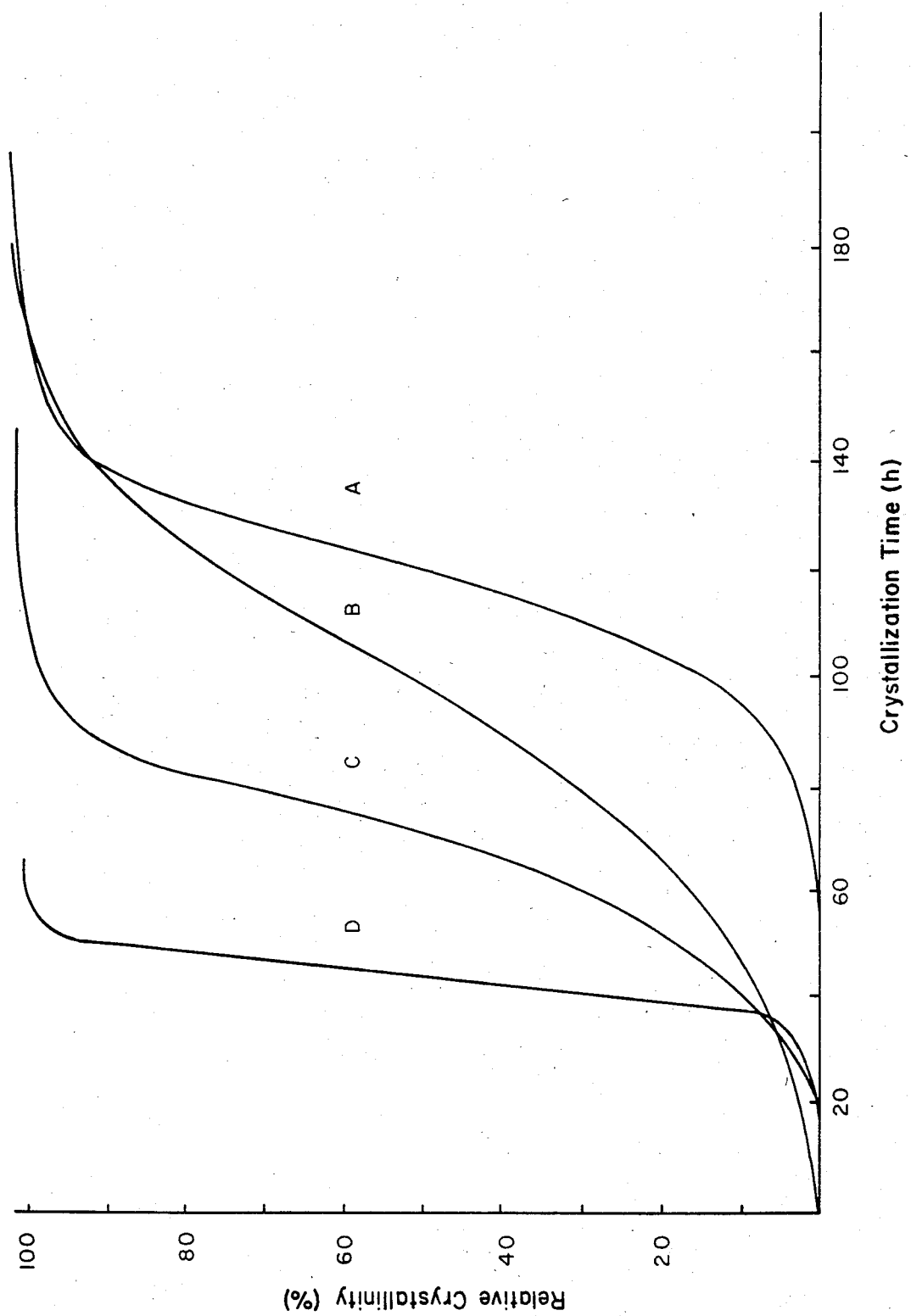

METHOD OF PREPARING CRYSTALLINE ZEOLITIC ALUMINOSILICATES

The invention concerns a method of preparing crystalline zeolitic aluminosilicate, especially of the ZSM-5 or ZSM-11 structural types. The atomic ratio of silicon to aluminum in aluminosilicates of this type is generally equal to or greater than 10, with the aluminum content tending toward zero in the extreme case. "Aluminosilicates" without aluminum or with only a little are called "silicalites."

Crystalline zeolitic aluminosilicates of the ZSM-5 or ZSM-11 structural types are becoming increasingly significant as catalysts or catalyst carriers.

Zeolitic aluminosilicates of the ZSM-5 structural type can be prepared for example as described in U.S. Pat. No. 3,702,866 from mixtures of reactive $SiO_2$ and $Al_2O_3$ by hydrothermal crystallization in the presence of sodium ions and of quaternary ammonium compounds like tetrapropylammonium salts. A drawback to this and to similar methods is that the crystallization times are very long at economically interesting concentrations of the tetrapropylammonium ion. Furthermore, ZSM-5 crystals of various sizes result from this process, which is a drawback with respect to their exploitation as catalysts.

The object of the invention is to provide a method of preparing crystalline zeolitic aluminosilicates that is free of the drawbacks of the state of the art. The rate of hydrothermal crystallization in particular is to be considerably increased accompanied by improved end-product crystal size, which ranges from 0.1 to 100 $\mu$m.

The invention accordingly concerns a method of preparing crystalline zeolitic aluminosilicates with an atomic Si-to-Al ratio $\geq 10$ by hydrothermal crystallization from a reaction batch that contains $SiO_2$ and $Al_2O_3$ or their hydrated derivatives or alikali silicates and aluminates along with crystallization accelerators and if necessary quaternary ammonium compounds in an aqueous and alkaline medium, characterized in that an aged but still X-ray amorphous aluminosilicate nucleating gel with an atomic Si-to-Al ratio $\geq 10$ is added to the reaction batch as a crystallization accelerator.

The atomic Si-to-Al ratio of the nucleating gel does not absolutely have to equal that of the crystalline end products. Preferably compositions for the nucleating gel can be used with the aluminium content tending toward zero.

The addition of the nucleating gel can considerably increase the rate of crystallization. The amount of nucleating gel added can also affect the size of the end-product crystals. Increasing the rate of crystallization also allows syntheses to occur at low nucleation temperature as compared with the same batch composition without the nucleation gel. Furthermore, cheaper and more accessible organic nitrogen compounds or other organic compounds, e.e. alcohols, may be employed instead of the relatively expensive tetrapropylammonium salt; even the complete elimination or organic substances may then be allowed.

The rate of crystallization is generally increased by increasing the nucleation rate and/or the crystal-growth rate. The contribution of crystal nuclei to the synthesis of ZSM-5 is in itself known (cf. e.g. U.S. Pat. No. 4,175,114 & German Offenlegunsschrift No. 2 935 123). The present invention relies, however, on the employment of an aged but not yet crystalline X-ray amorphous nucleating gel with aforesaid atomic Si-to-Al ratio.

An aged nucleating gel with the composition (in molar terms)

$SiO_2:AlO_2^- \geq 20$, $HO^-:SiO_2 = 0.05$ to $1.0$, quaternary ammonium compound:$SiO_2 = 0.0$ to $2.0$, and preferably $=0.01$ to $2.0$, $H_2O:SiO_2 = 10$ to $1000$, wherein the quaternary ammonium compound is preferably a tetrapropylammonium salt ($TPA^+$), especially the bromide, or tetrapropylammonium hydroxide (TPAOH) is preferably employed. In one variant of the method just described, cheaper and more easily accessible nitrogen compounds, amines for example and preferably $C_2$ to $C_6$ diamines, or a mixture of alcohol and ammonia and polyvalent alcohols, preferably $C_2$ to $C_8$ diols, can be employed.

Aluminosilicate crystals of various sizes are obtained depending on the amount of nucleating gel added to the reaction batch. Small amounts of nucleating gel (4–20% by weight in terms of the $SiO_2$ content of the prepared reaction batch) produce crystals ranging in size from 10 to 100 $\mu$m. Larger amounts of nucleating gel (20–40% by weight) produce smaller crystals, ranging size from 0.5 to 10 $\mu$m. Generally the resulting crystal sizes range from about 0.1 to 100 $\mu$m, with from 4 to 40% by weight and preferably from 15 to 25% by weight of the nucleating gel in terms of the $SiO_2$ content of the prepared reaction batch being added.

There is a decisive advantage to adding an aged nucleating gel instead of innoculating with crystal nuclei that shows up in kinetics studies and is illustrated in the attached drawing. For a batch without nuclei, an induction period that can last 10 to 60 hours depending on conditions is observed. Subsequent to this induction period is a relatively rapid crystal growth. When crystal nuclei are added, the crystal growth commences immediately, but continues at a lower rate. Very small nuclei are necessary to obtain the highest possible growth rate. The aged nucleating gel employed in accordance with the invention increases the crystallization rate and abbreviates the induction period in accordance with the particular aging time. The nucleating gels can be aged at room temperature or at a slightly elevated temperature under atmospheric pressure and requires no additional expenditure of energy. The nucleating gel is usually aged under atmospheric pressure at 15° to 100° C. and preferably at 20° to 60° C. from 2 hours to 100 days and preferably from 10 to 50 days. Crystallization times are curtailed by 40 to 90% when the nucleating gels in accordance with the invention are employed. The advantage of severely curtailed crystallization times is that higher production rates can be obtained in a given plant, resulting in more economical manufacture.

The content of the conventionally employed tetrapropylammonium salts in the reaction batch can also be reduced by employing aged nucleating gels in accordance with the invention. The use of aged nucleating gel also entails the advantage that the severe curtailment in crystallization times allows continuous and hence also essentially more economical manufacture of the crystalline aluminosilicates. Thus, the crystallization time at a reaction temperature of 150° C. is only 6 hours. The process can be carried out in general at temperatures between 40° and 200° C.

A preferred aged nucleating gel has the composition (in molar terms)

$SiO_2:Al_2O_3 \geq 5$,
$HO^-:SiO_2 = 10^{-10}$ to 1.0,
quaternary ammonium compound:$SiO_2$ = 0.01 to 2.0,
$H_2O:SiO_2$ = 0.7–3000, and
$Me:SiO_2$ = 0.3 to 3.0,
where Me is an alkali or alkaline earth metal cation. Furthermore, an alkali fluoride, preferably sodium fluoride or ammonium fluoride, can be added to the reaction batch along with the aged nucleating gel at a molar ratio of $F^-:SiO_2$ = 0.4–1.5.

The invention will now be described with reference to the following examples without being limited in any way.

COMPARATIVE EXAMPLE A

Preparation of a silicalite 17.2 g of amorphous silicic acid with the composition $1SiO_2:0.5H_2O$ were mixed with 1.1 g of NaOH, 3.36 g of TPA-Br, and 45 g of water. The reaction batch had the molar composition ti $1SiO_2:0.11NaOH:0.05TPA-Br:10.5H_2O$.

Silicalite with a relative degree of crystallization of 100% (as determined by X-ray diffraction patterns) was obtained in 140 hours at a crystallization temperature of 85° C.

EXAMPLE 1

Preparation of a crystalline aluminosilicate of the silicalite type 16.3 g of amorphous silicic acid with the composition $1SiO_2:0.5H_2O$ were mixed with 0.9 g of NaOH, 3.2 g of TPA-Br, 42.7 g of water, and 3.6 g of nucleating gel. The nucleating gel was prepared by combining 6.9 g of amorphous silicic acid with the composition $1SiO_2:0.5H_2O$ with 1.6 g of NaOH, 1.3 g of TPA-Br, and 18 g of $H_2O$ while stirring at room temperature and aging it for 46 hours. This nucleating gel has the molar composition

$1SiO_2.0.39NaOH.TPA-Br.H_2O$.

The total reaction batch accordingly had the composition

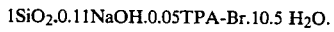
$1SiO_2.0.11NaOH.0.05TPA-Br.10.5 H_2O$.

When 3.6 g of this nucleating gel with a solids content of 32% by weight is added, it accounts for 5.7% by weight in terms of the total solids in the batch. The nucleating gel makes up 24% by weight in terms of the amount of the $SiO_2$ in the batch.

A crystalline aluminosilicate of the silicalite type and of the same degree of crystallization as that in Comparative Example A was obtained in 70 hours at a crystallization temperature of 85° C. This is a time saving of 50%.

EXAMPLE 2

Preparation of a crystalline aluminosilicate of the silicalite type 16.3 g of amorphous silicic acid with the composition $1SiO_2:0.5H_2O$ were mixed with 0.9 g of NaOH, 3.2 g of TPA-Br, 42.7 g of water, and 3.6 g of the nucleating gel described with reference to Example 1. The nucleating gel had been aged for 1200 hours at room temperature.

The total reaction batch accordingly had the composition $1SiO_2.0.11NaOH.0.05TPA-BR.10.5 H_2O$.

A silicate of the ZSM-5 type (silicalite) and of the same degree of crystallization as that in Comparative Example A was obtained at a crystallization temperature of 85° C. and a crystallization time of 25 hours. This is a time saving of about 82%.

COMPARATIVE EXAMPLE B

Preparation of a type ZSM-5 zeolite 17.2 g of amorphous silicic acid with the composition $1 SiO_2.0.5 H_2$ were mixed with 0.71 g of an aluminate solution (with 1000 g of the solution containing 100 g of NaOH, 205 g of $NaAlO_2$, and 695 g of water), 1.03 g of NaOH, 3.4 g of TPA-Br, and 44.5 g of water.

The reaction batch had the composition

$1SiO_2.0.007AlO_2^-.0.11NaOH.0.05TPA-Br.10.5H_2O$.

ZSM-5 with a relative degree of crystallization of 100% (as determined by X-ray diffraction patterns) was obtained in 130 hours at a crystallization temperature of 90° C.

EXAMPLE 3

Preparation of crystalline aluminosilicate of the ZSM-5 type using an aluminum-free nucleating gel 16.3 g of amorphous silicic acid with the composition $1SiO_2.0.5H_2O$ were mixed with 0.7 g of aluminate solution (with 1000 g of the solution containing 100 g of NaOH, 205 g of $NaAlO_2$, and 695 g of water), 0.83 g of NaOH, 3.4 g of TPA-Br, 42.2 g of water, and 3.6 g of the nucleating gel from Example 1. The nucleating gel had been aged for 77 hours at room temperature.

The total reaction batch accordingly had the composition

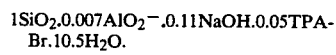
$1SiO_2.0.007AlO_2^-.0.11NaOH.0.05TPA-Br.10.5H_2O$.

An aluminosilicate of the ZSM-5 type with the same degree of crystallization as the sample in Comparative Example B was obtained at a crystallization temperature of 90° C. and a crystallization time of 70 hours. This is a time saving of about 41%.

EXAMPLE 4

Preparation of crystalline aluminosilicates of the ZSM-5 type using aluminum-free nucleating gel 16.3 g of amorphous silicic acid with the composition $1SiO_2.0.5H_2O$ were mixed with 0.7 g of aluminate solution (with 1000 g of the solution containing 100 g of NaOH, 205 g of $NaAlO_2$, and 695 g of water), 0.83 g of NaOH, 3.4 g of TPA-Br, 42.2 g of water, and 3.6 g of the nucleating gel from Example 1. The nucleating gel had been aged for 1200 hours at room temperature.

An aluminosilicate of the ZSM-5 type with the same degree of crystallization as the product in Reference Example B was obtained at a crystallization temperature of 90° C. and a crystallization time of 20 hours. This is a time saving of about 85%.

COMPARATIVE EXAMPLE C

Preparation of crystalline aluminosilicate of the ZSM-5 type using ethylene diamine 15.5 g of amorphous silicic acid with the composition 1SiO$_2$.0.1H$_2$O were mixed with 1.0 g of aluminate solution (with 1000 g of the solution containing 100 g of NaOH, 205 g of NaAlO$_2$, and 695 g of water), 2.9 g of NaOH, 15.0 g of ethylene diamine, and 210 g of water. The reaction batch had the composition 1SiO$_2$.0.01AlO$_2$⁻.0.3NaOH.Eda.47H$_2$O.Eda=ethylene diamine An aluminosilicate of the ZSM-5 type with a relative degree of crystallization of 60% was obtained in 140 hours at a crystallization temperature of 150° C.

EXAMPLE 5

Preparation of crystalline aluminosilicate of the ZSM-5 type using ethylene diamine and nucleating gel 14.4 g of amorphous silicic acid with the composition 1SiO$_2$.0.1H$_2$O were mixed with 1.0 g of aluminate solution (with 1000 g of the solution containing 100 g of NaOH, 205 g of NaAlO$_2$, and 695 g of water), 2.6 g of NaOH, 15.0 g of ethylene diamine, 206.5 g of water, and 5.0 g of the nucleating gel from Example 1. The nucleating gel had been aged at room temperature for 54 days.

The total reaction batch accordingly had the composition

1SiO$_2$.0.01AlO$_2$⁻.0.3NaOH.1Eda.47H$_2$O.

An aluminosilicate of the ZSM-5 type and with a relative degree of crystallization of 80% was obtained in 140 hours at a crystallization temperature of 150° C.

COMPARATIVE EXAMPLE D

Preparation of crystalline aluminosilicate of the ZSM-5 type using n-butanol and ammonia 15.5 g of amorphous silicic acid with the composition 1SiO$_2$.0.1H$_2$O were mixed with 1.0 g of aluminate solution (with 1000 g of the solution containing 100 g of NaOH, 205 g of NaAlO$_2$, and 695 g of water), 2.4 g of NaOH, 11.5 g of n-butanol, 2.9 g of ammonia solution (min. 25%), and 95 g of water.

The reaction batch had the composition

1SiO$_2$.0.01AlO$_2$⁻.0.25NaOH.0.62C$_4$H$_9$OH.0.17NH$_3$.21H$_2$O.

An aluminosilicate of the ZSM-5 type with a relative degree of crystallization of 60% was obtained in 72 hours at a crystallization temperature of 150° C.

EXAMPLE 6

Preparation of crystalline aluminosilicate of the ZSM-5 type using n-butanol, ammonia, and nucleating gel 14.4 g of amorphous silicic acid with the composition 1SiO$_2$.0.1H$_2$O were mixed with 1.0 g of aluminate solution (with 1000 g of the solution containing 100 g of NaOH, 205 g of NaAlO$_2$, and 695 g of water), 2.1 g of NaOH, 11.5 g of n-butanol, 2.9 g of ammonia solution (min. 25%), 90.5 g of water, and 5.0 g of the nucleating gel from Example 1. The nucleating gel had been aged for 60 days at room temperature.

The total reaction batch accordingly had the composition

1SO$_2$.0.01AlO$_2$⁻.0.25NaOH.0.62C$_4$H$_9$OH.0.17NH$_3$.21H$_2$O.

An aluminosilicate of the ZSM-5 type with the same relative degree of crystallization as the product in Comparative Example B was obtained in 20 hours at a crystallization temperature of 150° C. This signifies increased crystallinity and decreased crystallization time.

COMPARATIVE EXAMPLE E

Preparation of crystalline aluminosilicate of the ZSM-5 type in the absence of organic substances 15.5 g of amorphous silicic acid with the composition 1SiO$_2$.0.1H$_2$O were mixed with 1.0 g of aluminate solution (with 1000 g of the solution containing 100 g of NaOH, 205 g of NaAlO$_2$, and 695 g of water), 1.5 g of NaOH, and 170.3 g of water.

The reaction batch had the composition

1SiO$_2$.0.01AlO$_2$⁻.0.16NaOH.40H$_2$O.

An aluminosilicate of the ZSM-5 type with a relative degree of crystallization of 5-10% was obtained in 72 hours at a crystallization temperature of 200° C.

EXAMPLE 7

Preparation of crystalline aluminosilicate of the ZSM-5 type in the absence of organic substances and using the nucleating gel 14.4 g of amorphous silicic acid with the composition 1SiO$_2$.0.1H$_2$O were mixed with 1/0 g of aluminate solution (with 1000 g of the solution containing 100 g of NaOH, 205 g of NaAlO$_2$, and 695 g of water), 1.2 g of NaOH, 166.8 g of water, and 5.0 g of the nucleating gel from Example 1. The nucleating gel had been aged for 67 days at room temperature.

The total reaction batch accordingly had the composition

1SiO$_2$.0.01AlO$_2$⁻0.16NaOH.40H$_2$O(.0.0009TPA-Br).

(Note: the TPA-Br derives from the nucleating gel from Example 1).

An aluminosilicate of the ZSM-5 type with a relative degree of crystallization of 15-20% was obtained in 72 hours at a crystallization temperature of 200° C.

COMPARATIVE EXAMPLE F

Preparation of ZSM-11

15.5 g of amorphous silicic acid with the composition 1SiO$_2$.0.1H$_2$O were mixed with 1.1 g of NaOH, 4.6 g of tetrabutylammonium iodide (TBA-I), and 46.9 g of water.

The reaction batch had the composition

1SiO$_2$.0.11NaOH.0.05TBA-I.10.5H$_2$O.

A ZSM-11 with a relative degree of crystallization of 100% (as determined by X-ray diffraction patterns) was obtained in 240 hours at a crystallization temperature of 90° C.

EXAMPLE 8

Preparation of crystalline aluminosilicate of the ZSM-11 type using nucleating gel 14.4 g of amorphous silicic acid with the composition $1SiO_2.0.1H_2O$ were mixed with 0.8 g of NaOH, 4.6 g of TBA-I, 43.4 g of water, and 5.0 g of the nucleating gel from Example 1. The nucleating gel had been aged for 14 days at room temperature.

The total reaction batch accordingly had the composition $$1SiO_2.0.11NaOH.0.05TBA\text{-}I.10.5H_2O(.0.0009TPA\text{-}Br).$$

(Note: the TPA-Br derived from the nucleating gel.)

An aluminosilicate of the ZSM-11 type with the same degree of crystallization as the product in Reference Example F was obtained in 115 hours at a crystallization temperature of 90° C. This is a time saving of about 52%.

EXAMPLE 9

Preparation of aluminum-free crystalline aluminosilicate of the ZSM-5 type (silicalite) using nucleating gel in the presence of $NH_4F$ 16.3 g of amorphous silicic acid with the composition $1SiO_2.0.5H_2O$ were mixed with 0.9 g of NaOH, 3.2 g of TPA-Br, 4.6 g of ammonium fluoride ($NH_4F$), 42.7 g of water, and 3.6 g of the nucleating gel from Example 1. The nucleating gel had been aged 4 days at room temperature.

The total reaction batch accordingly had the composition $$1SiO_2.0.11NaOH.0.05TPA\text{-}Br.0.5NH_4F.10.5H_2O.$$

A coarsely crystalline aluminosilicate (with a particle size of about 40 to 60 μm) of the silicalite type with a relative degree of crystallization of 100% was obtained in 50 hours at a crystallization temperature of 90° C.

BRIEF DESCRIPTION OF DRAWING

The annexd drawing contains four curves in respect of four different preparations in which the crystallization time is plotted against relative crystallinity. For the data plotted in this drawing a silicate was prepared employing
$OH^-:SiO_2=0.1$
$TPA\text{-}Br:SiO_2=0.05$
$H_2O:SiO_2=10.5$.

The reaction temperature was 90° C.

- Curve A plots a preparation formed without nucleating gel,
- Curve B plots a preparation formed with crystal nuclei,
- Curve C plots a preparation formed with nucleating gel (aged 3 days),
- Curve D plots a preparation formed with nucleating gel (aged 50 days).

The crystal nuclei gel were obtained from the substances
$SiO_2:AlO_2^- = 140$,
$OH^-:SiO_2=0.25$,
$TPA\text{-}Br:SiO_2=0.05$, and
$H_2O:SiO_2=10.5$ at a reaction temperature of 90° C. and a crystallization time of 10 days. The nuclei accounted for 20% by weight in terms of the $SiO_2$ in the innoculated batch.

The nucleating gel had the composition $$1SiO_20.39NaOH.0.05TPA\text{-}Br.10.5H_2O$$

and accounted for 20% by weight in terms of the $SiO_2$ in the innoculated batch.

Relative crystallinity was determined from comparison with a reference substance prepared in accordance with U.S. Pat. No. 3,702,866 and characterized radiographically.

What is claimed is:

1. In a method of preparing crystalline ZSM-5 or ZSM 11 zeolites with an atomic Si-to-Al ratio $\geq 10$ by hydrothermal crystallization from a reaction batch that contains $SiO_2$ and $Al_2O_3$ or their hydrated derivatives or alkali silicates and aluminates along with crystallization accelerators, in an aqueous and alkaline medium, the improvement wherein an aged but still X-ray amorphous aluminosilicate nucleating gel with an atomic Si-to-Al ratio $\geq 20$ which has been aged at 15° to 100° C. from 2 to 100 days is added to the reaction batch as a crystallization accelerator.

2. A method according to claim 1, wherein an aged nucleating gel with the composition (in molar terms)
$SiO_2:AlO_2^- \geq 20$,
$HO^-:SiO_2=0.05$ to 1.0,
quaternary ammonium compound:$SiO_2=0.0$ to 2.0,
$H_2O:SiO_2=10$ to 1000
is employed 3. A method according to claim 1 wherein the aluminosilicate is prepared from a composition containing a quaternary ammonium compound which is a tetrapropylammonium salt.

4. A method according to claim 1 wherein the aluminosilicate is prepared in the copresence of a quaternary ammonium compound, amine or a mixture of alcohol and ammonia.

5. A method according to claim 4 wherein an amine, or a mixture of alcohol and ammonia is present in the reaction mixture.

6. A method according to claim 1 wherein the nucleating gel is one that has been aged under atmospheric pressure.

7. A method according to claim 6 wherein the nucleating gel is one that has been aged under atmospheric pressure at 20°-60° C. by 10-50 days.

8. A method according to claim 1 wherein the aged nucleating gel is added to reaction batches with the composition (in molar terms)
$SiO_2:Al_2O_3=5$,
$HO^-:SiO_2=10^{-10}\text{--}1.0$,
quaternary ammonium compound:$SiO_2=0.01\text{--}2.0$,
$H_2O:SiO_2=0.7\text{--}3000$, and
$Me:SiO_2=0.3\text{--}3.0$,
where Me is an alkali or alkaline earth metal cation is added to said reaction batch.

9. A method according to claim 1 wherein 4 to 40% by weight of the aged nucleating gel in terms of the $SiO_2$ content of the prepared reaction batch is added to the batch.

10. A method according to claim 9 wherein 15 to 25 percent by weight of the aged nucleating gel is added to said reaction batch.

11. A method according to claim 1 wherein the aged nucleating gel is employed in a reaction batch at a temperature of 40° to 200° C.

12. A method according to claim 1 wherein an alkali metal fluoride, or ammonium fluoride, is added to the reaction batch along with the aged nucleating gel at a molar ratio of $F^-:SiO_2 = 0.4-1.5$.

13. A method according to claim 12 wherein an alkali metal fluoride is added to said reaction batch and said alkali metal fluoride is sodium fluoride.

14. A method according to claim 2 wherein an aged nucleating gel with the composition (in molar terms)
$SiO_2:AlO_2^- \geqq 20$,
$HO^-:SiO_2 = 0.05$ to $1.0$
quaternary ammonium compound:$SiO_2 = 0.01$ to $2.0$
$H_2O:SiO_2 = 10$ to $1000$
is employed.

15. A method according to claim 3 wherein the aluminosilicate is prepared from a composition containing a quaternary ammonium compound which is tetrapropylammonium bromide (TPABr) or tetrapropylammonium hydroxide (TPAOH).

* * * * *